United States Patent [19]

Callahan et al.

[11] 4,048,671

[45] Sept. 13, 1977

[54] ADDRESS MATCH FOR DATA PROCESSING SYSTEM WITH VIRTUAL ADDRESSING

[75] Inventors: Robert William Callahan; Paul Eugene Kauffman, both of Endwell; Matthew Joseph Mitchell, Jr., Endicott, all of N.Y.

[73] Assignee: IBM Corporation, Armonk, N.Y.

[21] Appl. No.: 701,400

[22] Filed: June 30, 1976

[51] Int. Cl.² .................... G06F 9/06; G06F 9/16; G06F 13/00
[52] U.S. Cl. ............................................ 364/200
[58] Field of Search ............... 340/172.5; 445/1; 235/153 A; 364/200

[56] References Cited

U.S. PATENT DOCUMENTS

| | | | |
|---|---|---|---|
| 3,286,239 | 11/1966 | Thompson et al. | 340/172.5 |
| 3,693,165 | 9/1972 | Reiley et al. | 340/172.5 |
| 3,703,708 | 11/1972 | Foster | 340/172.5 |
| 3,949,379 | 4/1976 | Ball | 340/172.5 |

*Primary Examiner*—Melvin B. Chapnick
*Attorney, Agent, or Firm*—W. S. Robertson

[57] ABSTRACT

Apparatus for signalling the occurrence of a match between an address that is supplied to a control store and an address that is to be watched for in a data processing system that executes several instruction streams concurrently. The apparatus signals the occurrence of a storage accessing operation at a location that is uniquely identified only by a virtual address that is longer than the actual address used in accessing the store. Means is provided for comparing the actual address used in accessing the store with the corresponding portion of the complete address, and means is provided for recording the location of an address to be watched for in a particular frame of the store and for signalling a match that occurs in such a frame. The apparatus is useful for testing the operation of the data processing system by relating a recurring malfunction of the system to the execution of an instruction at the address that is watched for.

6 Claims, 2 Drawing Figures

ADDRESS MATCH FOR DATA PROCESSING SYSTEM WITH VIRTUAL ADDRESSING

RELATED APPLICATION

An application Ser. No. 701,373 of R. W. Callahan, P. E. Kauffman, L. J. Kobesky and H. L. Page for "Data Processing System With Means For Sharing Channel Background Processing," assigned to the assignee of this invention, and filed June 30, 1976 discloses other improvements to a channel processor with which this invention may be used.

INTRODUCTION

The apparatus of this invention provides a match signal when access is made to a selected address in a control store of a data processing system. Such an address match signal is useful in testing or diagnosing the operation of the data processing system. For example, a field engineer or other diagnostician may suspect that a malfunction occurs with the execution of a particular microinstruction. As a simple example, the field engineer might arrange for the system to stop whenever this particular microinstruction is encountered in the operation of the system. Similarly, a field engineer might arrange for the system to continue operation but the match signal would be used to trigger an oscilloscope to display the waveforms of selected components of the system on the occurrence of the instruction to be matched.

For an address match operation, a data processing system might be provided with an additional register for holding the address to be matched and with a compare circuit for comparing this address with the address held in the storage address register of the control store. The field engineer would load the additional register with the address to be matched and would arrange for the output of the compare circuit to trigger an oscilloscope or to otherwise modify the subsequent operation of the system.

OBJECTS OF THE INVENTION

The address match circuit of this invention is particularly intended to be used in a data processing system having a control store with virtual addressing. Some of the features and terminology of a virtual addressing system are described in a publication, Introduction to Virtual Storage in System/370, form number GR20-4260-1, available from the assignee of this invention. In the specific example that will be described later, the control store has 4096 addressable word locations, and the address register of the control store has 12 bit positions. ($2^{12}$ = 4096.) A group of 64 word locations makes up a unit of storage that will be called a "page frame" and holds a "page" of data. Some of these page frames are organized to hold only a particular set of microprogram instructions and this portion of the store is called the "resident storage" portion and the corresponding microprograms are called "resident microprograms." These microprograms are used by many types of programs and they are always maintained in the control store. Other page frames make up what is called "non-resident storage" and hold "non-resident" or "pageable" microprograms.

These non-resident microprograms are loaded into the control store from other storage locations as they are needed. The need for one of these non-resident control programs is identified by a microinstruction that will be called Load And Branch. This instruction has the virtual address (or a portion of the virtual address) of the page of the non-resident microprogram that is to be loaded into the control store for temporary use (plus the word location of the instruction that is to be fetched next from the new page).

It will be helpful to review the problems that are presented by the control store organization features that have been described so far. First, if the control store address that is to be matched is in the pageable portion of the control program, the associated page may be in the control store or not in the control store. Thus it is necessary to compare the full virtual addresses and not just the control store addresses in order to match a fetch operation on a selected instruction in a non-resident control program. Such an address may be much longer than the 12 bit address of the control store. The hardware circuits that were described earlier for comparing addresses are undesirable for comparing such large addresses. Such a comparison circuit has an Exclusive OR circuit for each pair of bits that is to be compared and it has an OR circuit to detect a single mismatch; such a network is costly and may be slow. Thus, one of the objects of this invention is to avoid the use of a large comparison circuit of this type.

Other objects of the invention will be presented later in relation to additional features of an associated data processing system that has been introduced in this description.

SUMMARY OF THE INVENTION

The apparatus of this invention includes a conventional compare circuit and associated registers for comparing the word portion of the control store address with the word portion of the address to be matched. In the specific example that will be described later, this compare circuit is only 6 bits wide, and in general it is only a few bits wide and is constructed of a few components that operate at high speed.

For each pageable frame of the control store in which an address to be matched can be loaded, this invention includes a latch that is set when the page containing the instruction to be matched is loaded into a page frame of the control store. This portion of the address is relatively long and the comparison operation is performed by general purpose components of the associated processor under control of a program. A match is signalled on the coincidence of a word match from the compare circuit and the set state of the latch for the time slice associated with the control word fetch operation. The compare circuit for the word portion of the address is combined with a compare circuit for the page portion of the control store address for matching the word and page portion of the control store address with the corresponding portion of the address to be matched when the instruction to be matched is in resident storage. This invention provides circuits and operations for performing an address match at either resident or non-resident storage and for distinguishing word address portion matches that occur in either location.

The comparison operations that otherwise would require very wide compare circuits are performed by microprogram routines that are held in one of the frames of pageable storage. In a specific example that will be described later, time slice 8 is used for these routines and for other diagnostic routines which may be used by maintenance personnel. This invention also provides a method and apparatus for detecting an address match that occurs within a diagnostic program operating in time slice 8.

THE DRAWINGS

THE EMBODIMENT OF THE DRAWING

Introduction To An Associated System

Figure 1:
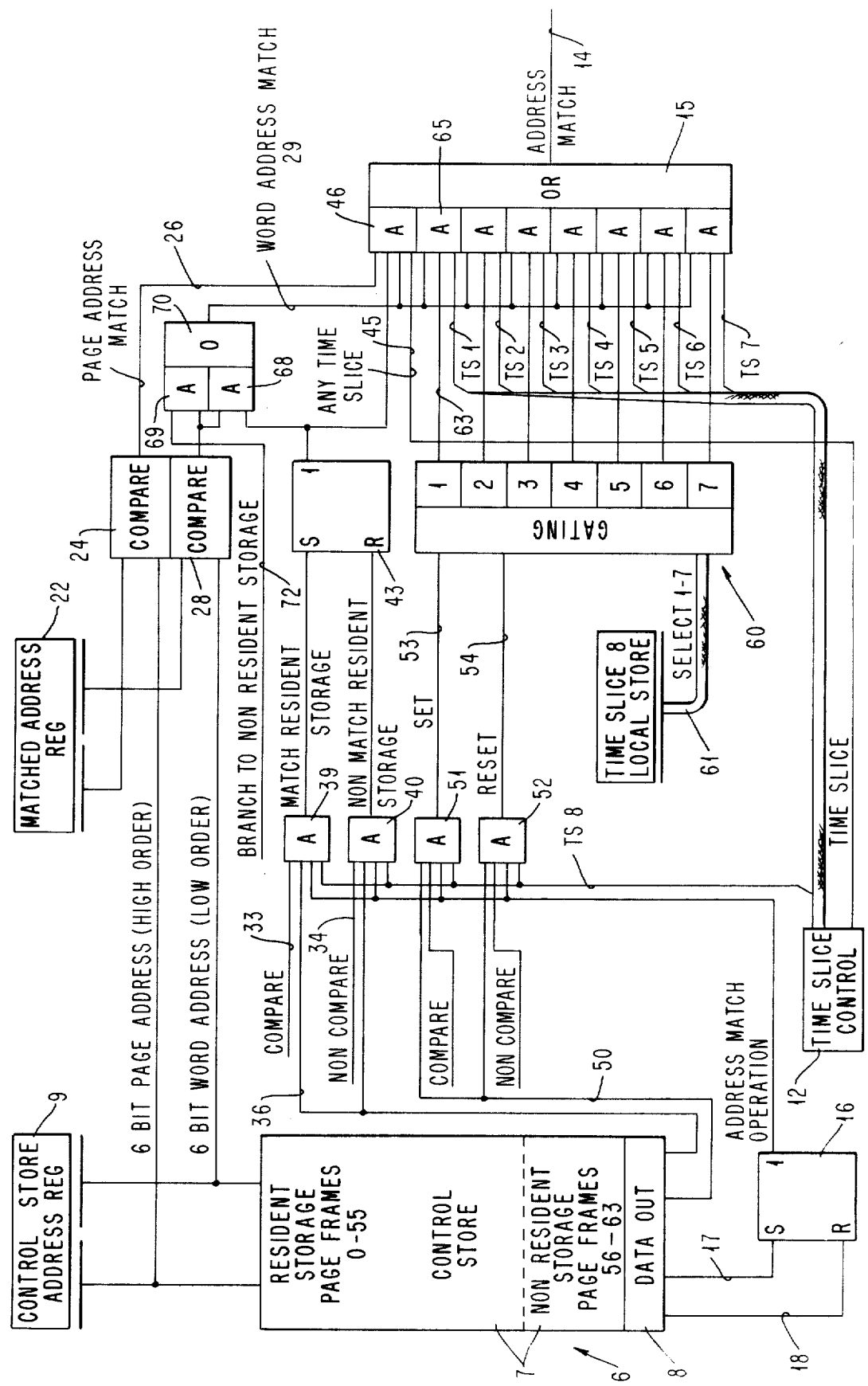
FIG. 1 is a diagram of the address match circuit of this invention and the related components of an associated data processing system.

FIG. 1 shows a conventional control store 6 having an array 7 of storage elements, a data register 8 for holding a word that is read from the array, an address register 9 for holding the address of the word location that is to be accessed, and accessing circuits (not shown) that access a word location in response to the address. The address register is loaded to read the next instruction in a microprogram from the store. This address is conventionally formed from various sources, typically the current machine language instruction, a field in the current microinstruction in data register 8, and latches that show the status of various operations in the system. Data register 8 also holds bits that control gates in the associated data processing system that interconnect various components of the system. These structural features of the control store are well known and the components of the drawing illustrate only the general features that will be referred to in the following discussion of this invention.

The control store of FIG. 1 illustrates the operation of this invention for address match on both resident and non-resident microprograms. The specific control store of FIG. 1 has 4096 addressable word locations and the store operates with a 12 bit address in storage address register 9. This 12 bit address can be divided into a high order 6 bit page address and a low order 6 bit word address. For example, the low order 6 bit address 101010 (decimal 48) identifies word location 48 in each of the 64 page frames in the array. This word address can be combined with a 6 bit page address to specify word 48 in a particular page of the store. Similarly, page address 101010 identifies page 48 in the array and can be used alone to identify this particular page or to identify some word location within page 48 that is not further identified. The 64 word locations can be called words 0 thru 63 and the 64 page locations can similarly be called page 0 thru 63.

In the store of FIG. 1, page frames 0 - 55 (000000 - 110111) are resident storage locations and hold the resident microprogram modules. The contents of resident storage are not changed in the operations that will be described in this specification. The eight page frames 56 - 63 (111000 - 111111) are used for non-resident microprogram modules. Each of these eight page frames is assigned to one of eight programs that can be run in an interleaved fashion in the system at one time. Each program is given access to the control store and to other resources of the system for a sequential interval of time that is called a "time slice". The time slices will be identified by a number 1 thru 8. Each page frame of non-resident storage is accessible only by the programs of the corresponding time slice. (Any time slice can access microprograms in the resident storage area.) For example, page frame 56 (the first page frame of non-resident storage) is accessible only to a program operating during time slice 1.

The associated system has a time slice control 12 for activating the eight concurrent programs in the time slice sequence that has been described. There are a variety of known ways in which this sequence and the length of the time slice can be controlled in systems to which this invention is applicable. Time slice control 12 also provides a time slice signal on each of eight lines TS1 thru TS8 that identify the operating time for each time slice. Time slice control 12 may comprise an 8 bit ring circuit, or it may have means for recognizing a wait or idle state in a time slice and skipping such a time slice in the selection sequence. There are many equivalent systems, and from a more general standpoint Time Slice Control 12 has means for selecting a program that is to have access to store 6 and related system resources.

The associated system also has means (not shown) for scheduling jobs and for assigning to a particular program the resources that are necessary for operating in an assigned time slice. The system of this invention uses some of the facilities of the control store in addition to special circuits that are shown in the drawing. In the specific embodiment of the invention that will be described later, the apparatus of the invention operates in association with the resources of time slice 8. Preferably, the program that is used by the apparatus of this invention is permanently resident in page frame 63 and time slice 8 is inactive and is skipped in the sequence of time slices except when the address match operation of this invention is performed. Alternatively, the program can be loaded into time slice 8 (or any other time slice) only when the apparatus of this invention is to be used and at other times time slice 8 can be used for other programs.

The Address Match Circuit

When the 12 bit page and word portion of an address to be matched is loaded into Control Store Address Register 9, the circuit of FIG. 1 produces a signal Address Match at output 14 of an OR circuit 15. The remaining components of the drawing will be described as they appear in the following explanation of an address match operation.

The address match operation begins when a field engineer accesses a diagnostic program that includes an address match function. The diagnostic program conventionally causes an appropriate page of microcode to be loaded into page frame 8 of the control store (or this microprogram module can be resident in page frame 8 as already explained). It also sets a latch 16 at the beginning of the address match operation and resets the latch at the end of the operation. (That is, a control word that is executed early in the microprogram of time slice 8 has a bit or decodable combination of bits to produce a signal on a line 17 to set latch 16, and another word in an exit routine from this microprogram similarly produces a signal on a line 18 to reset latch 16.) Latch 16 controls some of the branches in the microprograms that will be described, and it controls some of the microinstruction decoding circuits for the control store.

Preferably, the diagnostic program is an interactive program and directs the field engineer to enter the address of the instruction that is to be matched. (Alternatively, the address can be loaded by special circuits or procedures that are available only to field engineers.) This address is entered into a predetermined word location in the local store of time slice 8. In addition, the page portion and word portion of the address are loaded into a register 22 that will be called a Matched Address Register.

A compare circuit 24 compares the page portion of the address in control store address register 9 with the page portion of the address in Matched Address Register 22 and produces a signal, Page Address Match, on a line 26 when the page addresses are equal. Similarly, a compare circuit 28 compares the word portion of the addresses in registers 22 and 9 and produces a signal on a line 29 when the word addresses are equal. (Gates 68, 69, 70 in this data path will be described later.)

When the address to be matched is entered into the local store for time slice 8, the microprogram (equivalently the machine language diagnostic program) performs a compare operation between the page portion of this address and the highest page address of resident storage (page 55 in this example). The result of this compare operation signifies whether the address to be matched is in resident storage or in non-resident storage. Such a compare operation causes latches or other status indicators (not shown) to be set, and the outputs of these indicators are available to signify the results of this compare operation. A signal Compare on a line 33 carries a 1 logic level value when the address is in the range of resident storage (page address equal to or less than 55) and a signal Not Compare on a line 34 carries a 1 logic level when the address is in the range of non-resident pages (page address greater than 55). In response to a bit from a word of the control store on a line 36, the 1 output of latch 16, and the timing signal TS-8, an AND gate 39 or 40 transmits the signal Compare or Not Compare to set or reset a latch 43. The set state of latch 43 signifies that the address to be matched is located in resident storage, and this operation will be described next.

An AND gate 46 cooperates with OR gate 15 to produce the signal Address Match on the coincidence of the signal Page Address Match on line 26, Word Address match on line 29, the set state of latch 43, and a timing signal, Any Time Slice, on a line 45. This timing signal on line 45 is produced by the time slice control 12 and signifies that the other inputs to AND gate 46 are valid. This signal may be the OR logic function of the timing signals TS1 through TS7 that will be described later.

Figure 2:
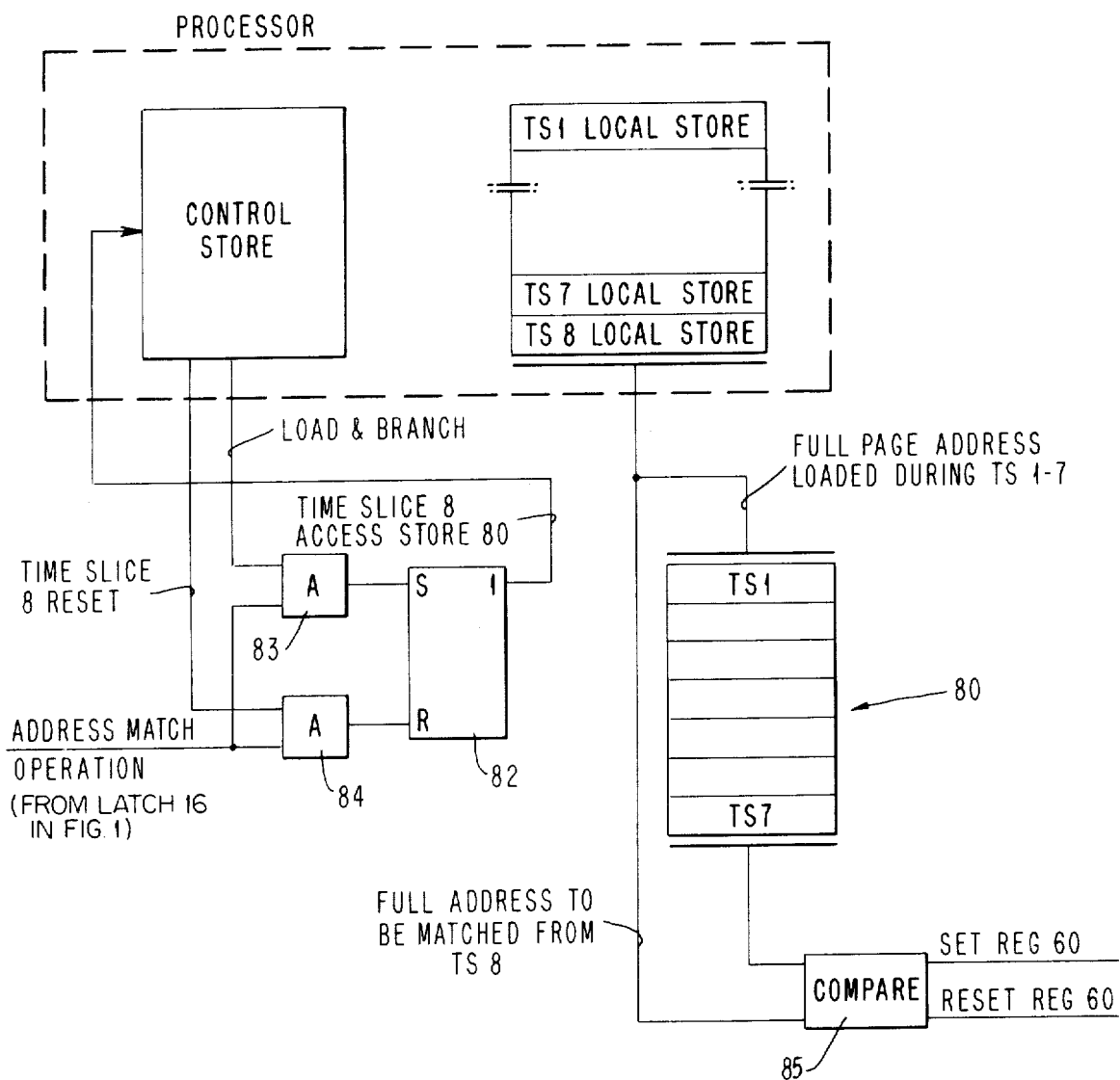
FIG. 2 is a diagram of a preferred circuit for recording the location of an address to be watched for in an address match circuit of FIG. 1.

When the address to be matched is in non-resident storage, latch 43 is reset. The microcode module containing the address to be matched may be loaded into any non-resident page frame of the control store. This load operation is performed by a microinstruction that will be called Load And Branch. When the Load And Branch instruction is encountered in the processing of a time slice, a page of microcode that is identified by the instruction is loaded into the page frame of non-resident storage assigned to the time slice executing the instruction and the next instruction in the microprogram for this time slice is fetched from the branch address. The Load And Branch microinstruction is modified to follow this procedure when latch 16 is reset to signify that an address match operation is not in progress but to branch to another microcontrol word when latch 16 is set. When latch 16 is set, a Load And Branch instruction is followed by an operation to store the address of the new page and the identification of the time slice in any predetermined storage location that is accessible to time slice 8. (The preferred storage system is shown in FIG. 2 nd will be described later.) Preferably the operation of the time slice executing the Load And Branch instruction stops until the next time slice so that an operation that might produce an address match will not take place until the circuit of the drawing has been conditioned to detect the match.

Time slice 8 has conventional microinstructions for fetching entries from the predetermined storage location and comparing the full address of the newly loaded page with the corresponding portion of the address to be matched which is held in the local store of time slice 8. By means of the status signals Compare and Not Compare and a bit in a control word in the program for time slice 8 shown on a line 50, AND gates 51 and 52 produce a signal Set or Reset on lines 53 and 54. A register 60 has a bit position for each time slice 1 thru 7, as numbers in the drawing represent. The identification of the register stage that is to be set is held in a storage location in the local store of time slice 8, and this word is loaded onto a bus 61 and applied with the Set and Reset signals to gating controls for the register.

Suppose that the program for time slice 1 has loaded into page frame 56 a microcode page that contains the instruction that is to be matched. This condition is signalled by a 1 logic level on the output 63 of stage 1 of register 60. An AND gate 65 cooperates with the OR gate 15 to produce the signal Address Match when register stage 1 is set and when the other inputs to AND gate 65 signify that a match has occurred. The input TS1 from Time Slice Control 12 signifies that the instruction fetch operation is for time slice 1. The signal Word Address Match on line 29 signifies that the instruction being fetched is in the word location of the address to be matched. Corresponding components shown in the drawing operate similarly for the other time slices.

The circuit of the drawing has been described so far as though the instruction fetch operation takes place in the non-resident storage and not in the corresponding word address location in a page frame of resident storage. In many situations it can be expected that most instruction fetch opertions will in fact take place in non-resident storage, or special test programs can be prepared that assure that the program operates only in non-resident storage. However, access to resident storage or to non-resident storage are readily detectable by a variety of techniques. In the circuit of the drawing an AND gate 68 and an OR gate 70 transmit the signal Word Address Match only when latch 43 is set to signify that the word to be matched is in resident storage (and a full 12 bit match is required to open gate 46). An AND gate 69 cooperates with OR gate 70 to transmit Word Address Match only when a signal Branch To Non-Resident Storage on a line 72 is at a 1 logic level. This signal is from a status word for each time slice that is held in local storage. It is set on a branch to non-resident storage and reset on a return to resident storage. Equivalently, a fetch operation to non-resident storage can be detected by a value 111 in the three high order bits in the word address portion of address register 9.

FIG. 2 shows a preferred circuit for setting register 60. A separate store 80 is provided for holding the address of a page that is loaded into the control store. Store 80 has seven word locations, each assigned to a particular time slice. When a Load And Branch instruction is encountered while latch 16 is set, the operating time slice executes a microinstruction to transfer the full address of the new page from its local store to its assigned location in store 80. (From a more general standpoint, store 80 holds any portion of the address that is not otherwise available for the subsequent operation of time slice 8.) Time Slice Control 12 may provide the address for accessing store 80 for this operation. Preferably, a latch 82 is also set on the occurrence of a Load And Branch instruction. An AND gate 83 responds to the coincidence of the signal Address Match Operation from latch 16 (not shown in FIG. 2) and to a bit (or a decodable combination of bits) from a microinstruction that signifies that a Load And Branch instruction is being executed. In response to the set state of latch 82, the next operation of time slice 8 branches to a routine to sequentially fetch (and then clear) each word location in store 80 and to use the conventional resources of the processor for a compare operation (represented by block 85) on each valid address in store 80 and the address to be matched, which is held in the local store of time slice 8. At the end of this operation, time slice 8 resets latch 82 by supplying a signal to an AND gate 84. These operations to set latch 82 from microinstructions that are executed during time slices 1 – 7 and to reset latch 82 from microinstructions that are executed during time slice 8 are similar to the operations already described for latch 16.

The system of this invention is also adaptable to an operation to detect an address match in time slice 8. For this operation, a position in register 60 and a corresponding AND gate are provided for time slice 8. Pages of microinstructions that may be loaded into a page frame that is allocated to time slice 8 are given an identifying header at the beginning of the page. As a further modification to these pages, the first instruction to be executed is a Branch And Link instruction that permits the subsequent operations to be performed by microprograms in resident storage. The first of these instructions is a return to the next microinstruction in time slice 8 if latch 16 is reset. If latch 16 is set to signify that an address match operation is taking place, subsequent microinstructions in resident storage compare the information in the header for the page just loaded into non-resident storage with the full address to be matched. If there is a match, the bit position in register 60 for time slice 8 (not shown in FIG. 1) is set and if there is not a match this bit position is reset. The operation then returns to the next microinstruction in non-resident storage for time slice 8. An address match in time slice 8 is detected by the coincidence of the set state of the corresponding bit in register 60, a signal TS8 from Time Slice Control 12, and the signal Word Address Match on line 29, as has already been described in relation to the corresponding components that are shown in the drawing.

Those skilled in the art will recognize a variety of applications for the apparatus of this invention, and suitable variations in the specific embodiment of the invention that has been described will be apparent within the scope of the claims.

What is claimed is:

1. Apparatus for detecting an address match in a data processing system having,
    a store having a plurality of page frames and being accessible according to a first address having a page address portion and a word address portion, and
    means for loading into a page frame of said store a page that is identified by a second address having a page address portion and a higher order bit portion, an address to be matched being uniquely identified by the combination of said second address and said word address portion of said first address,
    wherein the improvement comprises,
        means for holding the word portion of an address to be matched,
        means connected to said means for holding the word portion of an address to be matched and connected to receive said word address portion of said first address for comparing the word portion of the address to be matched and said word portion of said first address and for producing a word address match signal,
        a register having a bit position for each of said page frames of said store, each bit position of said register being adapted to be set to identify any page frame containing the page in which the word to be matched is located,
        means for identifying a page frame being accessed in said store, and
        means connected to receive said word address match signal and connected to each bit position of said register and to said means for identifying a page frame being accessed in said store for signalling an address match in response to the coincidence of said word address match signal and an operation to access a page frame for which a bit in said register has been set.

2. The apparatus of claim 1 wherein said data processing system includes a time slice control and means for allocating each of said page frames of said store to programs operating at times established by said time slice control and wherein,
    said means for identifying a page frame being accessed in said store comprises means connected to said time slice control for identifying the page frame allocated to the operating time slice.

3. The apparatus of claim 2 wherein said page frames of said store constitute non-resident storage and said store further includes page frames of resident storage, whereby a word location in resident storage is uniquely identified by the page and word portions of said first address, and wherein said apparatus further comprises,
    means for holding the page portion of an address to be matched that is located in resident storage,
    means connected to said means for holding the page portion of an address to be matched and connected to receive said page portion of said first address for comparing the page portion of an address to be matched and said page portion of said first address and for producing a page address match signal,
    a latch and means connecting said latch to be set when the address to be matched is in resident storage and to be reset when the address to be matched is in non-resident storage, and
    means connected to be responsive to the coincidence of said word address match signal, said page address match signal, and the set state of said latch for signalling an address match.

4. The apparatus of claim 3 wherein said store includes a further page frame allocated for the operations of setting and resetting said latch and setting and resetting said register.

5. The apparatus of claim 3 wherein said means for producing said word address match signal includes means for inhibiting the response to said work match signal of said means for signalling an address match when said latch is reset and a store access operation is to said resident storage.

6. The apparatus of claim 5 wherein said means of said data processing system for loading a page into a page frame of said store comprises microprogram instruction execution means and wherein said apparatus includes, a second store having a predetermined word location for each time slice arranged to be loaded with the full page address of a page loaded into a further page frame of said store and to be accessed under control of microprograms in said further page frame for comparing an address in said second store with the address to be matched and wherein said further page frame includes microinstructions for setting a corresponding bit position of said register in the event of a page match and resetting the corresponding bit position in the event of a mismatch.

* * * * *